United States Patent [19]

Tarpley, Jr. et al.

[11] Patent Number: 5,489,071
[45] Date of Patent: Feb. 6, 1996

[54] CASSETTE TAPE PLAYER HAVING CIRCUIT FOR DETECTING REVERSE ROTATION OF TAKE-UP REEL

[75] Inventors: Gerald W. Tarpley, Jr., Ann Arbor; Kenneth C. Miller, Canton; Karen M. Carlson, West Bloomfield, all of Mich.

[73] Assignee: Ford Motor Company, Dearborn, Mich.

[21] Appl. No.: 223,626

[22] Filed: Apr. 6, 1994

Related U.S. Application Data

[63] Continuation-in-part of Ser. No. 963,209, Oct. 19, 1992, abandoned.

[51] Int. Cl.$^6$ .......................... G03B 21/50; G11B 15/00; G11B 15/48
[52] U.S. Cl. .................... 242/333.7; 360/74.2
[58] Field of Search .................... 242/333.6, 333.7, 242/534, 563; 360/74.2

[56] References Cited

U.S. PATENT DOCUMENTS

| | | | |
|---|---|---|---|
| 3,647,157 | 3/1972 | Chitty | 242/333.7 |
| 3,915,407 | 10/1975 | Zaydowicz et al. | 242/332.5 |
| 4,256,274 | 3/1981 | Schatteman | 242/333 |
| 4,348,702 | 9/1982 | Taraborrelli | 360/71 |
| 4,478,376 | 10/1984 | Sakaguchi et al. | 242/334.1 |
| 4,494,712 | 1/1985 | Godwin, Jr. et al. | 242/333.7 |
| 4,508,280 | 4/1985 | Hayosh et al. | 242/333.7 |
| 4,597,547 | 7/1986 | Tarpley, Jr. et al. | 242/333.7 |
| 4,632,333 | 12/1986 | Tarpley, Jr. | 242/334.4 |
| 4,951,161 | 8/1990 | Suzuki et al. | 360/71 |
| 4,993,659 | 2/1991 | Takai et al. | 360/74.2 X |
| 5,018,040 | 5/1991 | Nishida | 360/137 |
| 5,209,422 | 5/1993 | Lee | 242/334.5 |

FOREIGN PATENT DOCUMENTS

| | | |
|---|---|---|
| 3829052 | 3/1989 | Germany . |
| 3916792 | 12/1989 | Germany . |

*Primary Examiner*—John Q. Nguyen
*Attorney, Agent, or Firm*—Mark L. Mollon; Roger L. May

[57] ABSTRACT

A system for preventing improper tape feed in a cassette tape player uses pulse width measurements from the take-up reel output signal to sense normal or aberrant tape feeding conditions. The pulse width of the output signal is compared with a predetermined range of pulse widths associated with normal tape operation. The range is variable as a function of the rotational frequency of the take-up reel and is updated periodically to reflect changes in the diameter of the take-up reel as the tape plays. If the pulse width of the output signal falls outside of the predetermined range, it denotes an aberrant tape feeding condition.

9 Claims, 6 Drawing Sheets

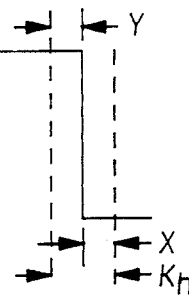
fig-8
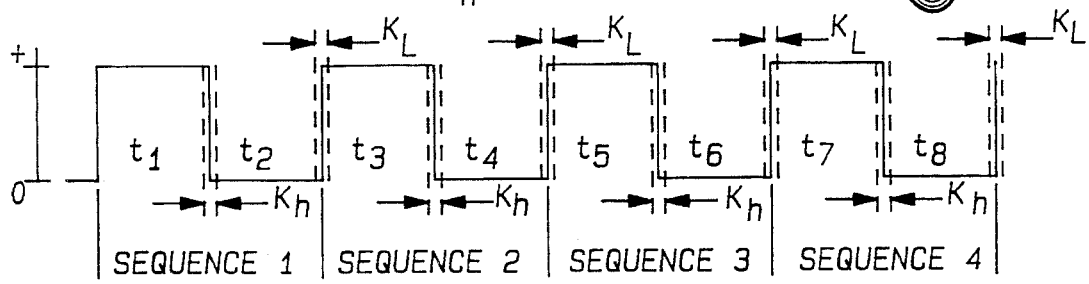
SEQUENCE 1 | SEQUENCE 2 | SEQUENCE 3 | SEQUENCE 4
fig-9
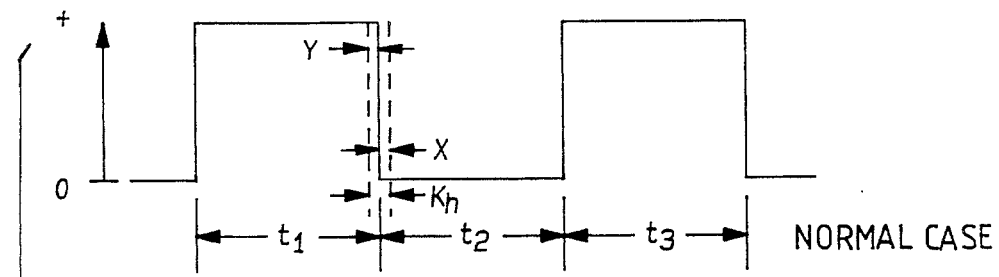
NORMAL CASE
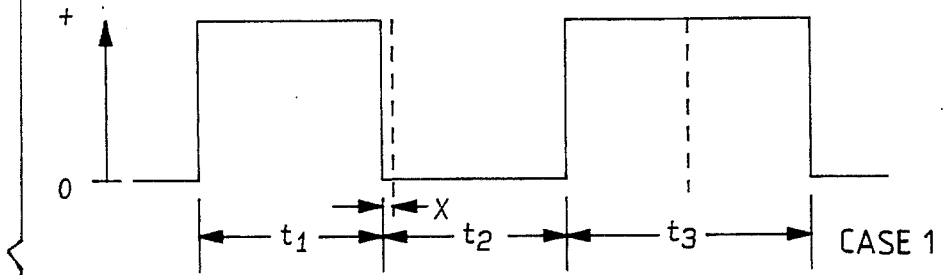
CASE 1
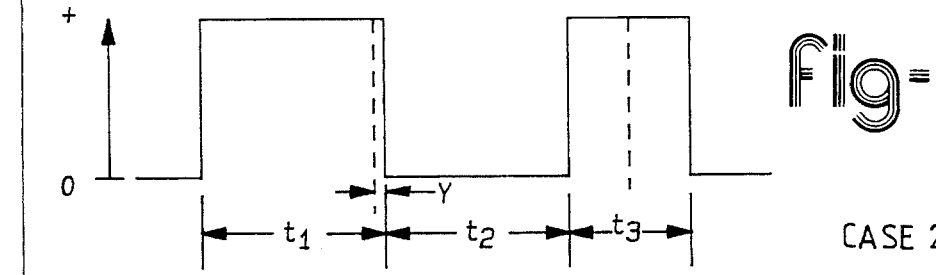
CASE 2
fig-10
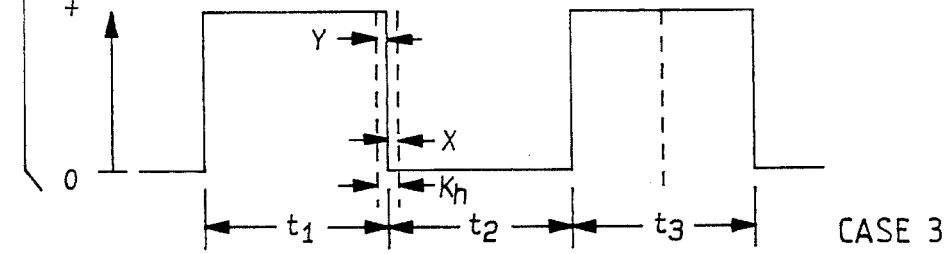
CASE 3

CASSETTE TAPE PLAYER HAVING CIRCUIT FOR DETECTING REVERSE ROTATION OF TAKE-UP REEL

REFERENCE TO RELATED APPLICATION

This is a continuation-in-part of U.S. application Ser. No. 07/963,209, filed Oct. 19, 1992, abandoned.

TECHNICAL FIELD

The present invention relates to cassette tape players with a system for preventing improper tape feed and more particularly to a circuit and algorithm having a variable detection means for detecting reverse or erratic rotation of the take-up reel of a cassette tape.

BACKGROUND OF INVENTION

Vehicles and home entertainment systems commonly use audio cassette tapes for recording and playback of music and other audio recordings. Cassette tape cartridges vary widely in quality of material and design. The best cassette tape cartridges are made from impact and heat resistant materials which are durable and provide thousands of hours of quality playback. However, many manufacturers use inferior cassette tape cartridges due to their low cost. "Bargain" cassettes may not comply with minimum standards for cassette design, testing and manufacturing. If a cassette is not manufactured to precise tolerances, it will not maintain uniform rolling friction of internal parts and may result in improper tape guidance. In severe cases, this may result in tape spilling into the transport mechanism and wrapping around the capstan. A condition commonly referred to as "tape eating" occurs when tape spills from the cassette and wraps onto the capstan, pinch roller or other parts of the cassette player. "Tape eating" occurs relatively frequently in home and vehicle cassette tape players.

Three principal factors are associated with "tape eating": (i) the cassette take-up hub may not rotate freely; (ii) the tape may be loosely wound on the tape reels or separated from the tape pack; (iii) the cassette may have thin tape commonly used in long-playing C-120 cassettes.

When take-up hub rotation is impaired, tape pulled by the capstan from the supply reel does not wind onto the take-up hub. Tape then spills into the tape transport mechanism and wraps onto the capstan or pinch roller. The cause of impaired take-up reel rotation is generally related to one of the following conditions and cassette cartridge defects:

the hub may be dislodged out of position and jammed as a result of the cassette being dropped.

the cassette shell may be made from low-grade plastic which warps upon exposure to high temperatures.

improper sonic welding of a cassette may cause misalignment between the two shell halves which reduces internal dimensional tolerances.

inadequate internal support between the two half shells of the cassette may result in shell deformation when placed in a tape player.

Step formations in the tape pack may cause excessive friction, especially when repeated changes in play and fast forward or rewind modes occur in cassettes having poor internal tape guidance.

"Tape eating" caused by loose tape is more frequently encountered with vehicle cassette tape players than in home tape players due to the extreme conditions in which the tapes are used and stored. When the cassette tapes are stored in the vehicle outside their protective case, vehicle vibrations can be transferred to the cassette and loosen the tape. Upon insertion, the tape may spill into the mechanism, at which time the tape can wrap onto the capstan.

"Tape eating" caused by the use of thin tape, like C-120 and C-90 tapes, can result from an initial formation of a small loop in the tape caused by the tape following the curvature of the capstan upon initial insertion. If a cassette tape cartridge does not have ramps or tape strippers required by the industry standard, a portion of the tape will be able to follow the capstan rotation, catch under the pinch roller, and subsequently wrap around the capstan.

It is estimated that a significant percentage of all cassette system failures in vehicle warranty claims are in some way related to defective or improperly stored cassette cartridges. Cassette system failures are costly to equipment manufacturers, particularly during the warranty period. When a consumer returns a vehicle to the dealer for repair, it is frequently necessary to entirely remove and disassemble the tape player from the vehicle for service leading to consumer dissatisfaction.

Several attempts have been made to prevent "tape eating" in the prior art. One example is disclosed in Taraborrelli U.S. Pat. No. 4,348,702 which describes a device for preventing tape windup on the capstan of a tape deck. The Taraborrelli device incorporates a rotation-sensing switch and switch wiper mounted on the bottom of a take-up spindle. The rotation sensing switch only allows rotation when the take-up spindle rotates in a proper direction. If the take-up spindle changes direction due to tape windup on the capstan, a tab on a rotation-sensing switch engages a vertical edge at the bottom of the take-up spindle and stops the sensor switch from rotating. When the rotation-sensing switch stops, the rotation-sensing circuit disables the drive mechanism to prevent additional tape windup on the capstan. However, the rotation sensing switch is not sensitive enough to detect the tape windup as soon as it happens and additional tape may wind up during the time the switch moves to engage the vertical edge.

Another approach is disclosed Tarpley, Jr. et al U.S. Pat. No. 4,597,547 which describes a logic circuit for detecting reverse rotation of a take-up reel in a tape transport mechanism wherein three motion sensing switches are added to a tape player adjacent the take-up reel to detect a sequence of switch actuation according to the sequence of A–B–C. Subsequent switch activation sequences are then monitored by a logic circuit which can sense and react to an improper switching sequence. The switches and logic circuit are additional elements which must be added to a cassette tape player, thereby increasing cost. Additionally, there is no way to adjust the sensitivity of the motion sensing switches to compensate for changes in the rotational velocity of the take-up reel, making early detection difficult.

In Tarpley, Jr. U.S. Pat. No. 4,632,333 another circuit sensing improper rotation of a take-up reel is disclosed wherein three switches are provided on the cassette player adjacent to the take-up reel. The sensing circuit outputs a pulse each time the sensor switches are actuated. Monostable multivibrators receive the pulses and provide output signals into a gate which responds by providing a control signal to a sensor switch. Improper rotation of the take-up reel interrupts this control signal, causing the sensor switch to respond by stopping or reversing the tape deck mechanism. The need for switches and monostable multivibrators in a special sensing circuit again increase the cost of the cassette tape deck equipped with such a system.

The present invention is directed to overcome the above disadvantages noted in conjunction with prior art systems and to provide a new system which surpasses the prior art in efficiency and simplicity.

SUMMARY OF INVENTION

The present invention incorporates in a tape player a circuit for detecting aberrant operational conditions soon after they occur which can be implemented without incurring significant additional cost for additional hardware or circuitry. It is an object of the invention to provide such a system wherein an algorithm can be programmed into any microprocessor-controlled tape deck or microprocessor-based AM/FM radio utilizing inputs from already existing spindle rotation sensor inputs to detect proper operation and the aberrant operational conditions.

It is also an object of the invention to use already existing hardware and microprocessor capacity to reduce the cost of implementing a "tape eating" or aberrant operational condition system with little or no additional cost except for the cost of programming existing microprocessor capacity with the algorithm disclosed.

Another object is to provide a detection system which can adjust its defined range of normal operation to account for varying operating conditions in the tape player and to enable early detection of aberrant tape conditions regardless of where on the tape the aberration occurs.

According to the present invention, a cassette tape player having a capstan, a take-up reel spindle and a supply reel spindle is described. An actuator attached to the bottom of the take-up reel spindle in the cassette tape player rotates as the spindle rotates, and the rotating actuator actuates a sensor mounted on the cassette tape player as the take-up reel spindle rotates to produce a periodic output signal. As the diameter of the take-up reel increases with tape accumulation thereon, the period and therefore the pulse width of the signal also increases. A microprocessor control receives the output signal and compares the pulse width of the output signal to a pulse width range derived from a prior signal. Time constants are both added to and subtracted from one or more selected pulse widths of the prior signal to determine a range in which the pulse width of the output signal should fall during normal operation. This range is compared to the pulse width of the output signal. A control signal in response to an aberrant tape condition is generated when the pulse width of the output signal is outside the normal operating range, thereby indicating reverse or erratic rotation of the take-up reel caused by the tape beginning to wind around the capstan of the cassette tape player. If the pulse width of the output signal falls within the normal operating range, the range is updated before measuring the next pulse width in order to accommodate the subsequent change in pulse width of the output signal and maintain a narrow normal range of operation.

The invention will become apparent upon review of the attached drawings in conjunction with the following detailed description of the invention.

BRIEF DESCRIPTION OF THE DRAWINGS

FIG. 8 is a diagrammatic view illustrating the variables utilized by the algorithm of the present invention.

FIG. 9 is a diagrammatic view illustrating the constant adjustment of pulse width value utilized in the algorithm of the present invention.

FIG. 10 is a diagrammatic view showing the output of the circuit when an aberrant tape condition is signalled by the system.

BEST MODE FOR CARRYING OUT THE INVENTION

Figure 1:
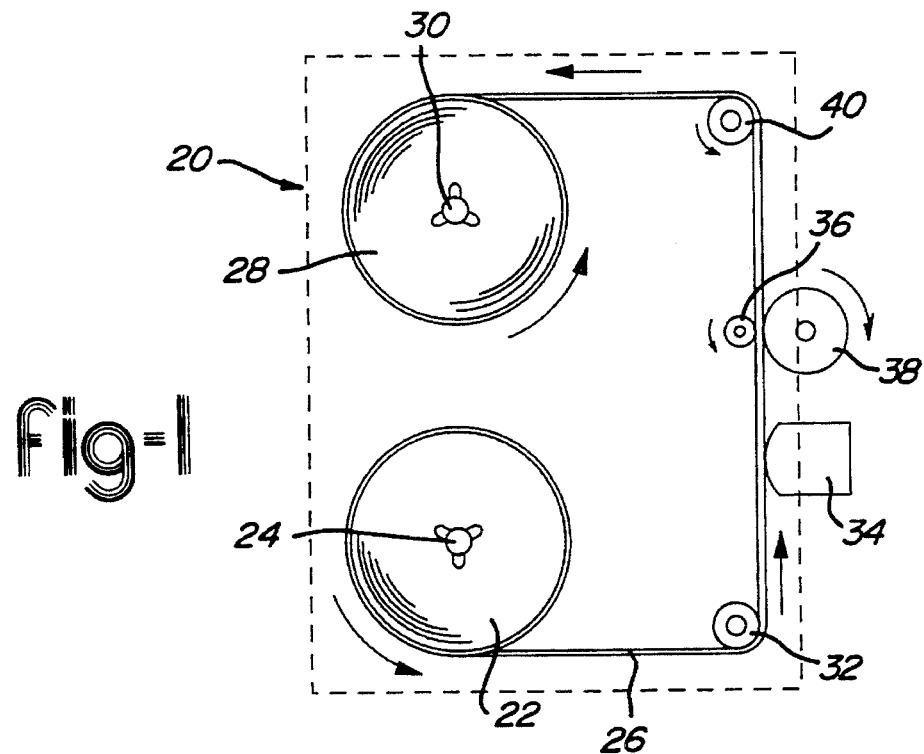
FIG. 1 is a plan view of a reel-to-reel cassette tape deck under normal operating conditions.

A tape deck generally indicated by reference numeral 20 is shown. The tape deck 20 includes a supply reel 22 secured to a supply reel spindle 24. A magnetic tape 26 is transferred between supply reel 22 and a take-up reel 28 which is secured to a take-up reel spindle 30. The tape 26 is guided by feed alignment roller 32 past the playback head 34. A capstan 36 and pinch roller 38 move the tape at a constant speed past the playback head 34. A take-up alignment roller 40 guides the tape 26 as it is fed from between the capstan 36 and pinch roller 38 to the take-up reel 28.

Figure 2:
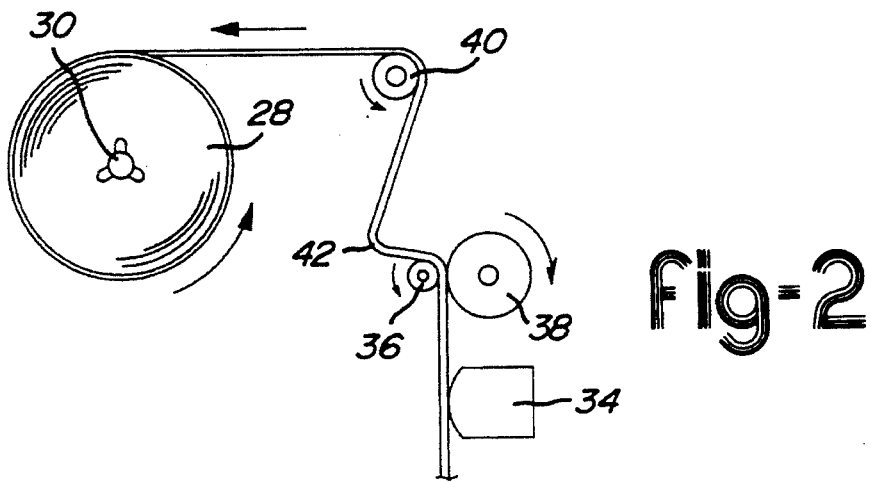
FIG. 2 is a plan view of a conventional reel-to-reel cassette tape deck developing a slack tape loop adjacent to capstan.

FIG. 2 illustrates a common condition wherein a loop 42 forms between the capstan roller 36 and the take-up alignment roller 40. This occurs upon initial start-up of the tape deck 20 or if the take-up reel 28 stops rotating. The loop 42 forms as tape follows the curvature of the capstan roller 36. Normally the loop 42 is automatically eliminated as the take-up reel 28 takes up the excess tape 26.

Figure 3:
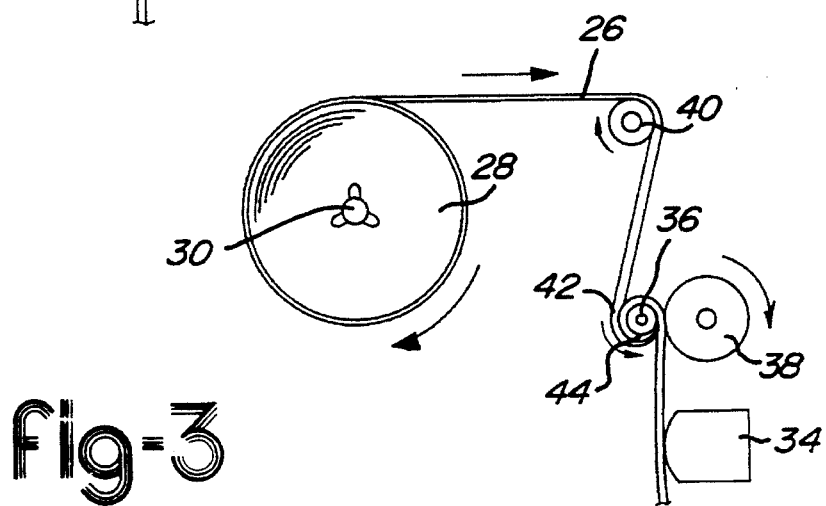
FIG. 3 is a plan view of a portion of a conventional cassette tape deck showing a slack loop wrapping around the capstan and being caught between the incoming tape and the capstan.

Referring now to FIG. 3, an aberrant tape feed condition is illustrated wherein the loop 42 becomes caught around the capstan roller 36 and forms a roll 44 of tape which rapidly accumulates on the capstan roller 36. If the loop becomes caught between the capstan roller 36 and the pinch roller 38, the rotation direction of the take-up reel 28 is reversed and tape feeds in the reverse direction from the take-up reel 28 as it winds about the capstan roller 36. Any delays in detecting the reverse rotation of the take-up reel 28 enables additional tape to wrap around the capstan roller 36, making the roll 44 larger and more likely to damage the tape deck. Ideally, the aberrant tape condition is detected as soon as the loop 42 catches between the capstan roller 36 and the pinch roller 38.

Figure 4:
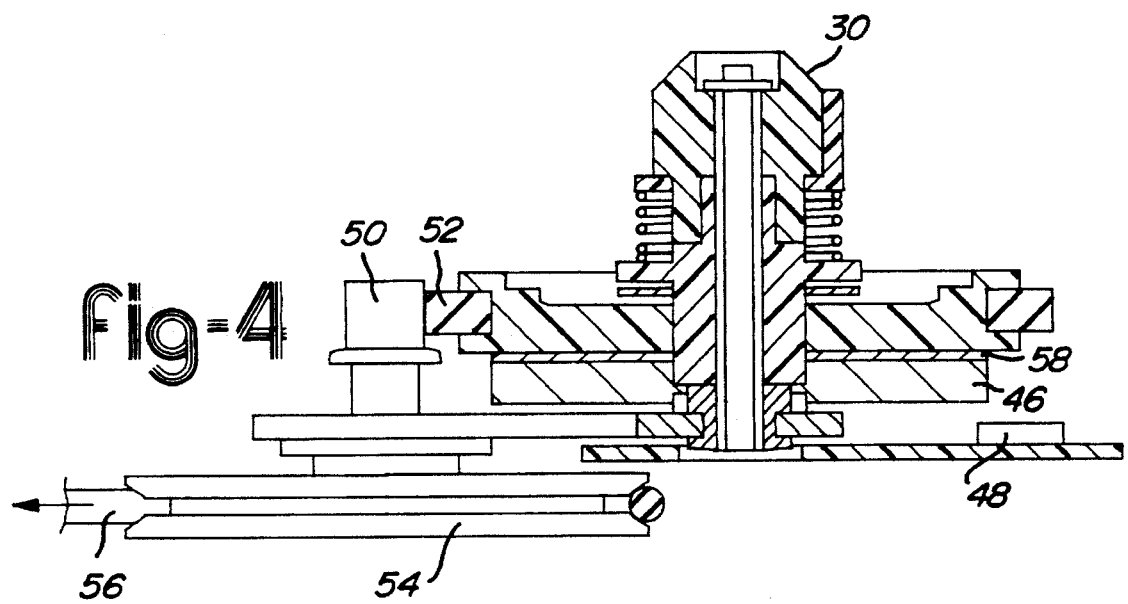
FIG. 4 is a cross-sectional view of the take-up reel spindle.

FIG. 4 shows the structure of a take-up reel spindle 30 in cross-section. A spindle drive 50 frictionally engages a rubber ring 52 which is secured to the take-up reel spindle 30 to drive the spindle. A drive pulley 54 forms part of the spindle drive 50 and is rotated by means of a drive belt 56.

A multi-pole magnetized disc 46 is secured to the take-up reel spindle 30 as shown in FIG. 4. A slip clutch 58 prevents excess tension from occurring on the tape. A sensor such as a reed switch 48 responds to changes in the magnetic field caused by the rotation of the multi-pole magnetized disc 46. The multi-pole magnetized disc 46 and reed switch 48 currently exist in conventional tape decks for sensing end-of-tape and other spindle rotation conditions.

Referring to FIGS. 5 through 10, utilization of input from existing hardware such as the multi-pole magnetized disc 46 and reed switch 48 to detect aberrant tape conditions and reverse the rotation of the take-up reel utilizing an algorithm in conjunction with preexisting microprocessor control elements is explained.

Figure 5:
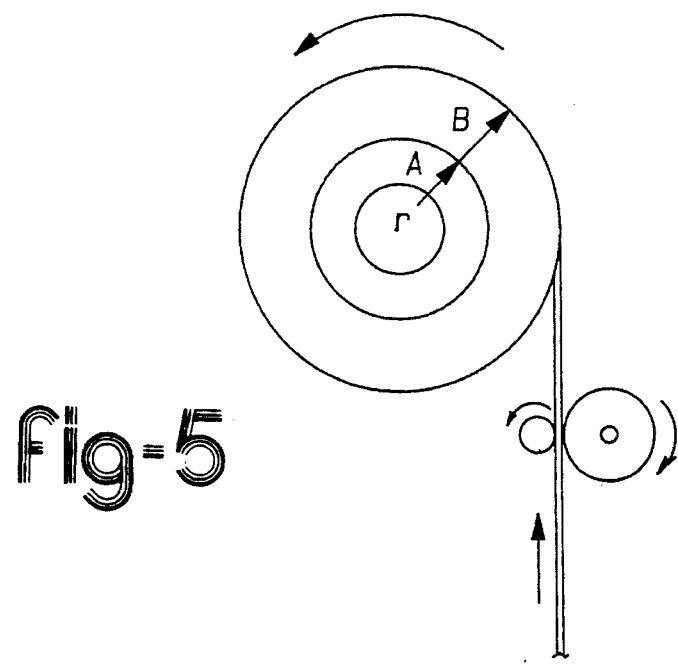
FIG. 5 is a diagrammatic view illustrating the effect of increasing the diameter of tape wound on the take-up reel spindle.

FIG. 5 diagrammatically illustrates variables utilized in the algorithm. The radius of the tape pack, designated r, increases as tape winds onto the cassette cartridge reel. As the radius increases, the rotational frequency of the take-up spindle decreases. The take-up reel rotates in a counterclockwise direction. The radius increases from a minimum radius of A for an empty take-up reel to a maximum radius of B for a full take-up reel.

$$\text{Frequency}_R = \frac{V}{2\pi r}$$

V=velocity
r=radius
A=minimum radius
B=maximum radius

For example, the radius for a C-60 cassette changes approximately 34 micrometers per revolution and consequently the rotational frequency changes approximately 0.002 revolutions per second.

Figure 6A:
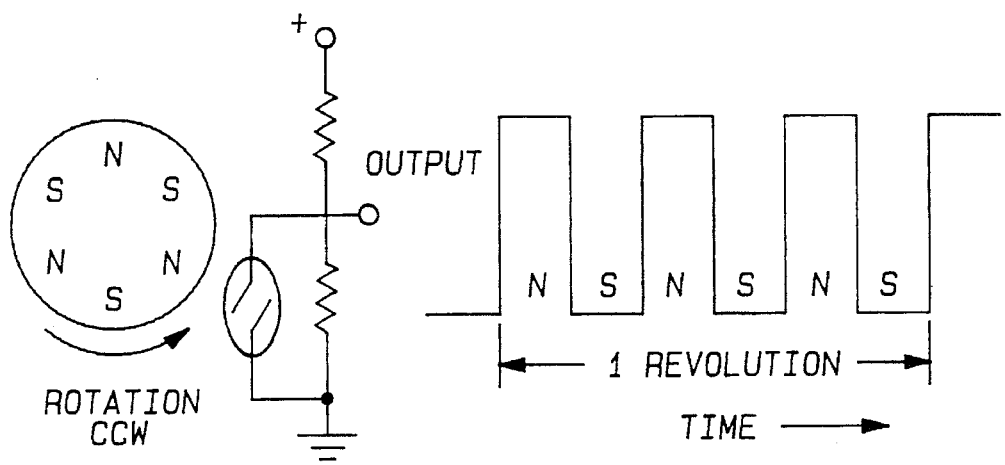
FIG. 6A is a diagrammatic view of the output of the circuit of the present invention when operating at radius A of FIG. 5.
Figure 6B:
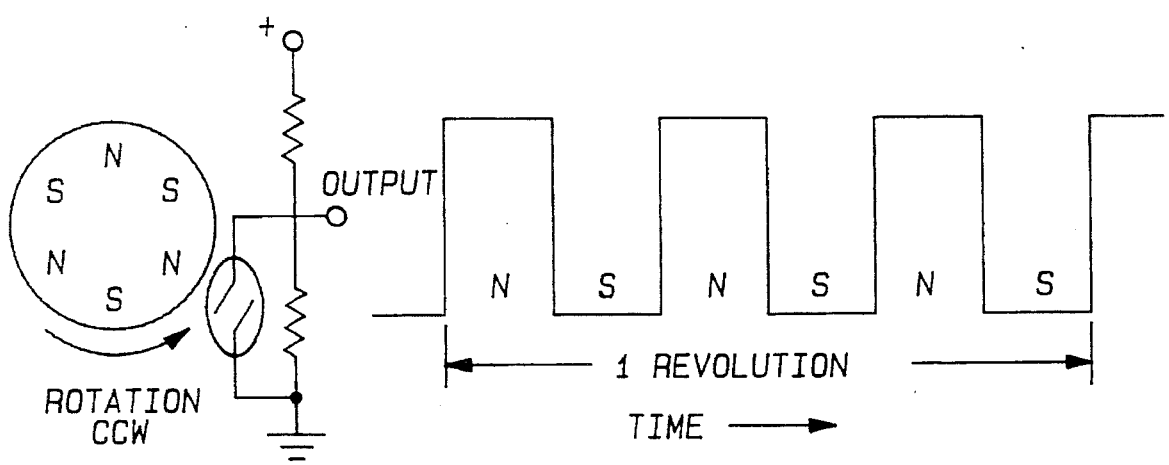
FIG. 6B is a diagrammatic view showing the output of the circuit of the present invention when operating at the radius B of FIG. 5.

FIGS. 6A and 6B illustrate the output of the take-up spindle sensor. FIG. 6A illustrates the take-up spindle sensor output for an empty take-up reel. For comparison, FIG. 6B illustrates the take-up spindle sensor output for a full take-up reel. The pulse width of the output signal is inversely proportional to the rotational frequency of the take-up reel. The rotational frequency is related to the radius of the tape pack as stated above, and consequently the pulse width of the output signal increases as the radius of the tape pack increases and the rotational frequency decreases. Similarly, the pulse width of the output signal decreases as the rotational frequency of the take-up reel increases.

Figure 7A:
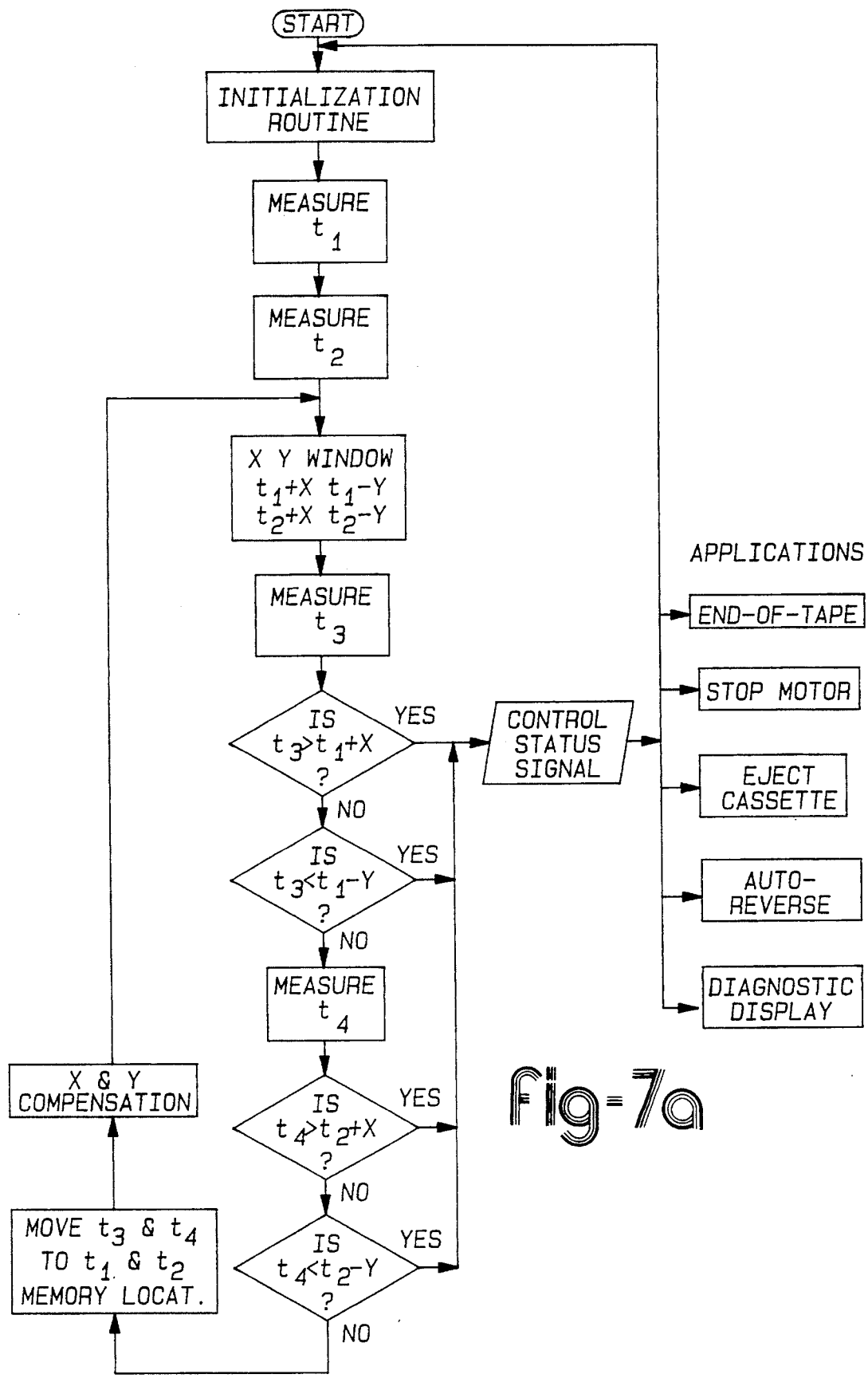
FIG. 7A is a flowchart illustrating the steps of one embodiment of the present invention.

Referring to FIG. 7A, the flowchart illustrating the steps of one embodiment of the reverse rotation detection algorithm will be described beginning with "START". The first step is an initialization routine wherein initial X and Y values are determined. This initial step is conducted because the diameter of the tape pack at the time the player is started could be any size, from full to empty and X and Y values previously stored for one tape may not be the correct values for another tape. For example, if one tape is ejected and another tape is replaced, the diameter of the tape on the take-up reel will almost always be different requiring adjustment of the X and Y values. Determination of the initial X and Y value is accomplished by measuring the first valid pulse width $t_1$. The microprocessor accomplishes this by determining whether the take-up spindle output signal is high or low when the tape player is started and then waiting for the first low-to-high or high-to-low transition in the output signal before proceeding with the pulse width measurement. The system measures both low and high pulses which are both compared by the algorithm for better resolution. The microprocessor then references the stored values for X and Y in a look-up table which correspond to selected pulse width values to be assigned. Once the initial X and Y values are assigned, they are periodically updated. The X and Y values are updated at predetermined pulse width switch point values. Each time a predetermined pulse width switch point value is encountered, X and Y values are updated.

Referring now to FIGS. 8 and 9, under normal operating conditions, a cassette cartridge is inserted into the cassette tape player and the drive motor is turned on, causing the take-up spindle to rotate and actuate the take-up reel sensor. When the microprocessor conducts the initialization process as described above, the first measured value $t_1$ of the take-up reel sensor causes the initial X and Y values to be assigned. In the next step, the pulse width values $t_1$ and $t_2$ are measured and stored in memory as reference values for later comparison. The pulse width value of $t_3$ is measured and compared to the value of $t_1+X$ and the value of $t_1-Y$. During normal operation, the value of $t_3$ meets the $t_1-Y<t_3<t_1+X$ condition and the pulse width value $t_4$ is then measured. The value of $t_4$ is then compared to the value of $t_2+X$ and the value of $t_2-Y$. If the value of $t_4$ meets the $t_2-Y<t_4<t_2+X$ condition for normal operation, the algorithm updates the $t_1$ and $t_2$ reference values with the $t_3$ and $t_4$ values respectively. The values of X and Y are also adjusted to maintain a constant proportional relationship between the measured pulse width value and the X and Y values as the diameter of the tape pack increases. X is updated by subtracting $t_3$ from $t_1+X$. Y is updated by subtracting $t_1-Y$ from $t_3$.

The pulse width value $t_5$ is then measured and compared to the value of $t_3+X$ and the value of $t_3+Y$. If the value of $t_5$ meets the $t_3-Y<t_5<t_3+X$ condition for normal operation the pulse width value $t_6$ is measured. The $t_6$ value is compared to the value of $t_4+X$ and the value of $t_4-Y$. If the value of $t_6$ meets the $t_4-Y<t_6<t_4+X$ condition for normal operation, the microprocessor updates the $t_3$ and $t_4$ reference values, with the $t_5$ and $t_6$ values respectively. The values of X and Y are also adjusted to maintain a constant proportional relationship between the measured pulse width value and the X and Y values as the diameter of the tape pack increases.

This process is continued as long as normal operation criteria continues to be met.

Using a single pulse width value to determine the acceptable range of operation is simple and easy to implement. However, it may not accurately take variations in sensor pulse data into account. These variations can occur due to varying forces and operating conditions placed on the spindles as well as the mechanics of the spindle itself. The best way to compensate for these fluctuations in the sensor pulse data is to use a plurality of pulse widths, rather than one pulse width, to choose the X and Y values and ultimately determine the range of normal operation at a particular point of the tape.

Figure 7B:
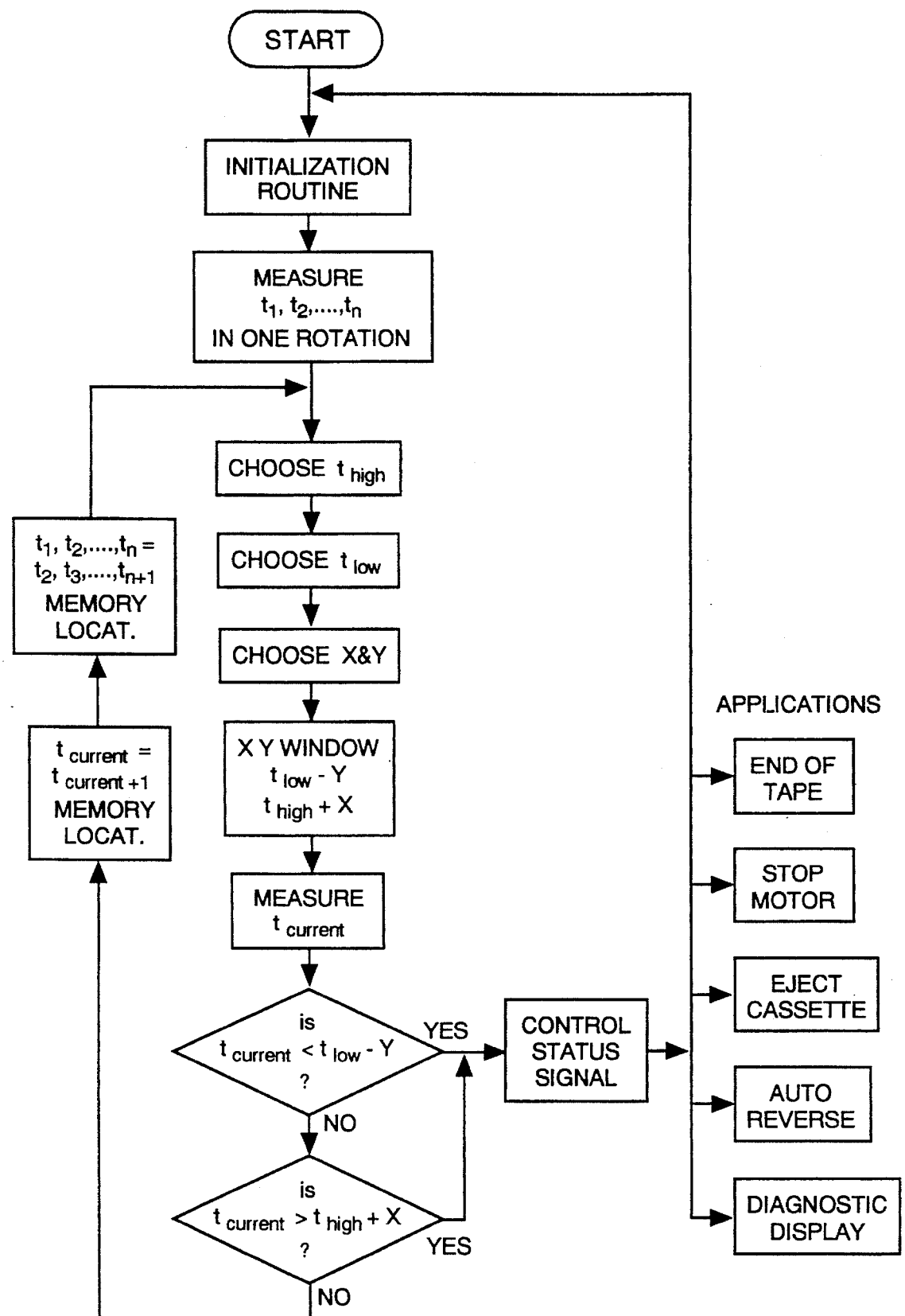
FIG. 7B is a flowchart illustrating the steps of the preferred embodiment of the present invention.

Referring to FIG. 7B, an alternative and preferred embodiment determines the X and Y values by comparing the plurality of pulse widths occurring after one rotation of the take-up reel spindle instead of simply measuring the first valid pulse width. After storing the plurality of the pulse width values in memory, the microprocessor assigns the value $t_{high}$ to the highest value in the set and $t_{low}$ to the lowest value in the set. The X and Y values are then chosen from a look-up table in memory based on the values of $t_{high}$ and $t_{low}$.

During normal operation, the pulse width value $t_{current(1)}$ meets the $t_{low(1)}-Y<t_{current(1)}<t_{high(1)}+X$ condition. If the value of $t_{current(1)}$ meets this condition, the algorithm updates the $t_{low(1)}$ and $t_{high(1)}$ reference values by comparing a new set of pulse widths where the last pulse in the set is $t_{current(1)}$. The algorithm then chooses a new $t_{high}$ and $t_{low}$ from this new set and consequently a possible new X and Y. The pulse width of $t_{current(2)}$, which is the pulse after $t_{current(1)}$, is the new pulse which is compared with the new range $t_{low(2)} - Y < t_{current(2)} < t_{high(2)} + X$, where $t_{low(2)}$ and $t_{high(2)}$ are the lowest and highest pulse width values of the new group of values stored in memory. The values of X and Y are also adjusted to maintain a constant proportional relationship between the measured pulse width value and the X and Y values as the diameter of the tape pack increases.

By periodically updating a narrow range of normal operation rather than comparing the output signal to a constant predetermined broad range, aberrant tape conditions can be detected almost instantaneously before excessive tape winds onto the capstan. Each calculated range is customized to detect an aberrant tape condition at each particular point of the tape, making early detection of aberrant tape conditions possible.

Referring now to FIG. 10, a graphical representation of the take-up spindle output signal during normal operation and three cases of output signals during aberrant tape feed conditions are juxtaposed. For simplicity, the first embodiment disclosed will be used as an example, but the same concepts apply to both embodiments. In the top illustration, normal conditions exist and the time $t_3$ falls within the range $t_1 - Y < t_3 < t_1 + X$ permitting normal operation to continue.

In case 1, $t_3$ is $> t_1 + X$ which falls outside the acceptable $t_1 - Y < t_3 < t_1 + X$ range. This occurs when the take-up spindle reverses direction after the 50% pulse width value of $t_1 + X$. When this condition occurs, the algorithm controlling the microprocessor sends a control signal to the cassette mechanism to either stop or reverse the mechanism.

In case 2, $t_3 < t_1 - Y$. This occurs when the take-up spindle reverses direction before the 50% pulse width value of $t_1 - Y$. When this occurs, the algorithm controlling again sends a control signal to the cassette mechanism to either stop or reverse the mechanism, depending upon the application.

Finally, in case 3 the take-up reel reverses direction after the pulse width value of $t_1 - Y$ and before the pulse width value of $t_1 + X$. When this condition is detected, the algorithm does not distinguish the "tape eating" condition from normal operation. The algorithm is ineffective to detect "tape eating" when it occurs within this narrow time frame ($K_h$).

Referring now to FIGS. 8–10, $K_h$ is defined as the sum of X and Y as the output signal goes from high to low. $K_L$ is the same sum as the output signal goes from low to high.

The present invention may be practiced using an Intel 8085 microprocessor based SDK-85 development system and the Tanashin Denki model TN-555 auto-reverse cassette mechanism. The interface between the microprocessor and the cassette mechanism included a PNP transistor biased as a saturated switch and a 7407 TTL high voltage hex inverter. The transistor was used to interface the take-up spindle output signal of the Hall effect sensors in the cassette mechanism to the 8355 I/O/ROM input port of the Intel 8085 microprocessor. The 7407 hex inverter interfaced the 8355 I/O/ROM output port to the program direction change input of the cassette mechanism.

Appendix A details a preferred software program which is written in Intel 8085 Assembly Language, as implemented in the first embodiment. Appendix B details a preferred software program written for National Semiconductor COP888E6 assembly language with a Tanashin TN 709 tape deck, as implemented in the second embodiment. A brief description of the major software routines is as follows:

| | |
|---|---|
| MAIN PROGRAM: | Executes initialization process, calls the sub-routines, and updates measured pulse width values. |
| DCHK SAMPLE SUB-ROUTINE: | Takes samples of sensor output. |
| COMPARE SUB-ROUTINE: | Calculates range of pulse widths for normal operation and compares the sensor output with the calculated range. |
| STOP/REVERSE CASSETTE SUB-ROUTINE: | Sends control signal to the cassette mechanism to either stop or reverse the mechanism. |

The above description describes only two preferred embodiments and is to be interpreted in an illustrative sense and not in a restrictive sense. There are alternate embodiments which have not been specifically mentioned but which are obvious and intended to be included within the scope of the invention as defined by the following claims.

Appendix A

ALGORITHM: INTEL 8085 ASSEMBLY LANGUAGE PROGRAM
MAIN PROGRAM

| Addr | Instruction | Code | Comment |
|---|---|---|---|
| 2000 | LXI SP,20C2 | 31 | Initialize stack pointer |
| 2001 |  | C2 |  |
| 2002 |  | 20 |  |
| 2003 | LXI H 03E8 | 21 | Load value of X |
| 2004 |  | E8 |  |
| 2005 |  | 03 |  |
| 2006 | SHLD 28EB | 22 | Store X |
| 2007 |  | EB |  |
| 2008 |  | 28 |  |
| 2009 | LXI H 03E8 | 21 | Load value of Y |
| 200A |  | E8 |  |
| 200B |  | 03 |  |
| 200C | SHLD 28ED | 22 | Store Y |
| 200D |  | ED |  |
| 200E |  | 28 |  |
| 200F |  | 00 |  |
| 2010 |  | 00 |  |
| 2011 | SUB A | 97 | Make Port 0 an input |
| 2012 | OUT 2 | D3 |  |
| 2013 |  | 02 |  |
| 2014 | WTL1: IN 0 | DB | Read sensor signal |
| 2015 |  | 00 |  |
| 2016 | ANI 000/000 | E6 |  |
| 2017 |  | 10 |  |
| 2018 | JNZ WTL1 | C2 | Is it low ? |
| 2019 |  | 14 |  |
| 201A |  | 20 |  |
| 201B | WTH1: IN 0 | DB | Read sensor signal |
| 201C |  | 00 |  |
| 201D | ANI 000/000 | E6 |  |
| 201E |  | 10 |  |
| 201F | JZ WTH1 | CA | Is it high ? |
| 2020 |  | 1B |  |
| 2021 |  | 20 |  |
| 2022 | LXI H,00 | 21 | Reset H&L to 0 |
| 2023 |  | 00 |  |
| 2024 |  | 00 |  |
| 2025 | CALL DCHK | CD | Goto sample subroutine |
| 2026 |  | 85 |  |
| 2027 |  | 20 |  |
| 2028 | JNZ 2025 | C2 | Is sensor signal low ? |
| 2029 |  | 25 |  |
| 202A |  | 20 |  |
| 202B | SHLD 28EF | 22 | Store t1 value |
| 202C |  | EF |  |
| 202D |  | 28 |  |

| Address | Instruction | Hex | Comment |
|---------|-------------|-----|---------|
| 202E | LXI H,00 | 21 | Reset H&L to 0 |
| 202F | | 00 | |
| 2030 | | 00 | |
| 2031 | CALL DCHK | CD | Goto sample subroutine |
| 2032 | | 85 | |
| 2033 | | 20 | |
| 2034 | JZ 2031 | CA | Is sensor signal high ? |
| 2035 | | 31 | |
| 2036 | | 20 | |
| 2037 | SHLD 28F1 | 22 | Store t2 value |
| 2038 | | F1 | |
| 2039 | | 28 | |
| 203A | LXI H,00 | 21 | Reset H&L to 0 |
| 203B | | 00 | |
| 203C | | 00 | |
| 203D | CALL DCHK | CD | Goto sample subroutine |
| 203E | | 85 | |
| 203F | | 20 | |
| 2040 | JNZ 203D | C2 | Is sensor signal low ? |
| 2041 | | 3D | |
| 2042 | | 20 | |
| 2043 | SHLD 28F3 | 22 | Store t3 value |
| 2044 | | F3 | |
| 2045 | | 28 | |
| 2046 | CALL 2892 | CD | Goto compare subroutine |
| 2047 | | 92 | |
| 2048 | | 28 | |
| 2049 | LXI, 00 | 21 | Reset H&L to 0 |
| 204A | | 00 | |
| 204B | | 00 | |
| 204C | CALL DCHK | CD | Goto sample subroutine |
| 204D | | 85 | |
| 204E | | 20 | |
| 204F | JZ WTH3 | CA | Is sensor signal high ? |
| 2050 | | 4C | |
| 2051 | | 20 | |
| 2052 | SHLD 28F5 | 22 | Store t4 value |
| 2053 | | F5 | |
| 2054 | | 28 | |
| 2055 | LHLD 28EF | 2A | Load H&L with t1 |
| 2056 | | EF | |
| 2057 | | 28 | |
| 2058 | XCHG | EB | Exchange H&L with D&E |
| 2059 | LHLD 28F1 | 2A | Load H&L with t2 |
| 205A | | F1 | |
| 205B | | 28 | |
| 205C | SHLD 28EF | 22 | Store t2 at t1 location |
| 205D | | EF | |
| 205E | | 28 | |
| 205F | XCHG | EB | Exchange D&E with H&L |
| 2060 | SHLD 28F1 | 22 | Store t1 at t2 location |
| 2061 | | F1 | |
| 2062 | | 28 | |
| 2063 | LHLD 28F3 | 2A | Load H&L with t3 |

| | | | |
|---|---|---|---|
| 2064 | | F3 | |
| 2065 | | 28 | |
| 2066 | XCHG | EB | Exchange H&L with D&E |
| 2067 | LHLD 28F5 | 2A | Load H&L with t4 |
| 2068 | | F5 | |
| 2069 | | 28 | |
| 206A | SHLD 28F3 | 22 | Store t4 at t3 location |
| 206B | | F3 | |
| 206C | | 28 | |
| 206D | XCHG | EB | Exchange H&L with D&E |
| 206E | SHLD 28F5 | 22 | Store t3 at t4 location |
| 206F | | F5 | |
| 2070 | | 28 | |
| 2071 | CALL 2892 | CD | Goto compare subroutine |
| 2072 | | 92 | |
| 2073 | | 28 | |
| 2074 | LHLD 28F5 | 2A | Load H&L with t3 |
| 2075 | | F5 | |
| 2076 | | 28 | |
| 2077 | SHLD 28EF | 22 | Store t3 at original t1 location |
| 2078 | | EF | |
| 2079 | | 28 | |
| 207A | LHLD 28F3 | 2A | Load H&L with t4 |
| 207B | | F3 | |
| 207C | | 28 | |
| 207D | SHLD 28F1 | 22 | Store t4 at original t2 location |
| 207E | | F1 | |
| 207F | | 28 | |
| 2080 | JMP 203A | C3 | |
| 2081 | | 3A | |
| 2082 | | 20 | |
| 2083 | | 00 | |

DCHK: SAMPLE SUBROUTINE

| | | | |
|---|---|---|---|
| 2084 | | 00 | |
| 2085 | INX H | 23 | Increment H&L register |
| 2086 | LXI D, 01 | 11 | Load delay value |
| 2087 | | 01 | |
| 2088 | | 00 | |
| 2089 | CALL DELAY | CD | Goto canned delay routine |
| 208A | | F1 | |
| 208B | | 05 | |
| 208C | IN 0 | DB | Read the sensor signal |
| 208D | | 00 | |
| 208E | ANI 10 | E6 | |
| 208F | | 10 | |
| 2090 | RET | C9 | Return to main program |
| 2091 | | 00 | |

COMPARE SUBROUTINE

| | | | |
|---|---|---|---|
| 2892 | LHLD 28EF | 2A | Load H&L with t1 |
| 2893 | | EF | |
| 2894 | | 28 | |
| 2895 | XCHG | EB | Exchange H&L with D&E |
| 2896 | LHLD 28EB | 2A | Load value of X |
| 2897 | | EB | |
| 2898 | | 28 | |
| 2899 | DAD D | 19 | Add t1 + X |
| 289A | SHLD 28F7 | 22 | Store t1 + X |
| 289B | | F7 | |
| 289C | | 28 | |
| 289D | LHLD 28ED | 2A | Load value of Y |
| 289E | | ED | |
| 289F | | 28 | |
| 28A0 | XCHG | EB | Load Y into D&E |
| 28A1 | LHLD 28EF | 2A | Load H&L with t1 |
| 28A2 | | EF | |
| 28A3 | | 28 | |
| 28A4 | MOV A,L | 7D | Move low byte to accumulator |
| 28A5 | SUB E | 93 | Subtract Y from t1 (low byte) |
| 28A6 | MOV L,A | 6F | Store value in L |
| 28A7 | MOV A,H | 7C | Move high byte to accumulator |
| 28A8 | SBB D | 9A | Subtract Y from t1 (high byte) |
| 28A9 | MOV H,A | 67 | Store value in H |
| 28AA | SHLD 28F9 | 22 | Store t1 − Y |
| 28AB | | F9 | |
| 28AC | | 28 | |
| 28AD | LHLD 28F3 | 2A | Load H&L with t3 |
| 28AE | | F3 | |
| 28AF | | 28 | |
| 28B0 | LDA 28F7 | 3A | Move low byte t1 + X to Acc |
| 28B1 | | F7 | |
| 28B2 | | 28 | |
| 28B3 | SUB L | 95 | Subtract t3 from t1 + X (low byte) |
| 28B4 | STA 28E7 | 32 | Store the result |
| 28B5 | | E7 | |
| 28B6 | | 28 | |
| 28B7 | LDA 28F8 | 3A | Move high byte t1 + X to Acc |
| 28B8 | | F8 | |
| 28B9 | | 28 | |
| 28BA | SBB H | 9C | Subtract t3 from t1 + X (high byte) |
| 28BB | STA 28E8 | 32 | Store the result |
| 28BC | | E8 | |
| 28BD | | 28 | |
| 28BE | JM 2800 | FA | Jump to stop cassette if S=1 |
| 28BF | | 00 | |
| 28C0 | | 28 | |
| 28C1 | LHLD 28F9 | 2A | Move t1 − Y to H&L |
| 28C2 | | F9 | |
| 28C3 | | 28 | |
| 28C4 | LDA 28F3 | 3A | Move low byte of t3 to Acc |
| 28C5 | | F3 | |

| | | | |
|---|---|---|---|
| 28C6 | | 28 | |
| 28C7 | SUB L | 95 | Subtract t1 - Y from t3 (low byte) |
| 28C8 | STA 28E9 | 32 | Store the result |
| 28C9 | | E9 | |
| 28CA | | 28 | |
| 28CB | LDA 28F4 | 3A | Move high byte of t3 to Acc |
| 28CC | | F4 | |
| 28CD | | 28 | |
| 28CE | SBB H | 9C | Subtract t1 - Y from t3 (high byte) |
| 28CF | STA 28EA | 32 | Store the result |
| 28D0 | | EA | |
| 28D1 | | 28 | |
| 28D2 | JM 2800 | FA | Jump to stop cassette if S=1 |
| 28D3 | | 00 | |
| 28D4 | | 28 | |
| 28D5 | RETURN | C9 | Return to main program |

STORAGE LOCATIONS

| | | |
|---|---|---|
| 28E7 | LOW BYTE | $(\Delta t_1 + x) - \Delta t_3$ |
| 28E8 | HIGH BYTE | $(\Delta t_1 + x) - \Delta t_3$ |
| 28E9 | LOW BYTE | $\Delta t_3 - (\Delta t_1 - y)$ |
| 28EA | HIGH BYTE | $\Delta t_3 - (\Delta t_1 - y)$ |
| 28EB | $X_L$ | |
| 28EC | $X_H$ | |
| 28ED | $Y_L$ | |
| 28EE | $Y_H$ | |
| 28EF | $\Delta t_1 L$ | |
| 28F0 | $\Delta t_1 H$ | |
| 28F1 | $\Delta t_2 L$ | |
| 28F2 | $\Delta t_2 H$ | |
| 28F3 | $\Delta t_3 L$ | |
| 28F4 | $\Delta t_3 H$ | |
| 28F5 | $\Delta t_4 L$ | |
| 28F6 | $\Delta t_4 H$ | |
| 28F7 | $\Delta t_1 + X_L$ | |
| 28F8 | $\Delta t_1 + X_H$ | |
| 28F9 | $\Delta t_1 - Y_L$ | |
| 28FA | $\Delta t_1 - Y_H$ | |

STOP / REVERSE CASSETTE SUBROUTINE

| Addr | Instruction | Code | Comment |
|---|---|---|---|
| 2800 | MVI A,FF | 3E | Make port 1 an output |
| 2801 |  | FF |  |
| 2802 | OUT 3 | D3 |  |
| 2803 |  | 03 |  |
| 2804 | MVI A, FB | 3E |  |
| 2805 |  | FB |  |
| 2806 | OUT 1 | D3 |  |
| 2807 |  | 01 |  |
| 2808 | LXID,3003 | 11 | Set delay for 100mS |
| 2809 |  | 03 |  |
| 280A |  | 30 |  |
| 280B | CALL DELAY | CD | Call canned delay routine |
| 280C |  | F1 |  |
| 280D |  | 05 |  |
| 280E | MVI A, FF | 3E | Turn off output port |
| 280F |  | FF |  |
| 2810 | OUT 1 | D3 |  |
| 2811 |  | 01 |  |
| 2812 | MVI,B FF | 06 | Initialization delay for |
| 2813 |  | FF | reversing cassette |
| 2814 | MVI,C FF | 0E |  |
| 2815 |  | FF |  |
| 2816 | DCR C | 0D |  |
| 2817 | JNZ | C2 |  |
| 2818 |  | 16 |  |
| 2819 |  | 28 |  |
| 281A | DCR B | 05 |  |
| 281B | JNZ | C2 |  |
| 281C |  | 14 |  |
| 281D |  | 28 |  |
| 281E | JMP 2000 | C3 | Return to start of main program |
| 281F |  | 00 |  |
| 2820 |  | 20 |  |

Appendix B

Sample Algorithms Used

"T2A" captures the $T_2$ time's beginning and ending edges

"CalcTime" calculates the actual $T_2$ time

"XYLookup" gets the XY values from the table, looked up by the relative position of the tape "CheckNewTime" uses the formula to see if the current measured time is within the required range of time values > "CmpThree" compares the 2 adjusted time values and returns whether the value is greater than the allowable range or less than the allowable range "StoreTimes" compares the current time to the highest and lowest values and swaps them if needed.

"ReCalcXY" is executed after every full spindle rotation to reinitialize the hi and low values for the next rotation

```
T2A:                                ;SPINDLE PULSE CAPTURE ROUTINE
                                    ;Is this a timer underflow?
    IFBIT   T2C0,T2CNTRL            ;  used for X/Y value lookup
    JMP     T2Under                 ;  Yes, update underflow counter T2A0:                               ;Keep SPindle Pulse time
    LD      X,#NewEdge              ;Get the low byte of timer
    LD      A,T2RALO
    X       A,[X+]
    LD      A,T2RAHI                ;Get the hi byte of timer
    X       A,[X]

IFBIT   FirstEdge,TPFLG1        ;NOT AN UNDERFLOW
    JMP     T2First                 ;If first edge, throw it away JSR     CalcTime                ;Calculate the elapsed time since
                                    ;  last edge, store the new edge
                                    ;  This is T1 time
    IFBIT   SecondEdge,TPFLG1       ;Is this the second edge?
    JP      T2Second                ;  Yes, get XY adjustor value from
                                    ;        lookup table
    JP      T2Test                  ;  No, make sure value is valid T2Second:                           ;SECOND EDGE RECEIVED
    JSR     XYLookUp                ;Get XY adjustor from look-up table
    JSR     StoreTimes              ;Compare and update the low and
                                    ;high times
    JMP     T2Exit
T2Test:
    JSR     CheckNewTime            ;TEST IF TIME IS VALID IFC                             ;If carry is set, error
    JMP     T2Err0
```

```
        JSR     StoreTimes              ;Compare and update the low and
                                        ;high times LD      A,NumTimesThrough       ;Increment the number of times this
        INC     A                       ;  interrupt has been processed
        X       A,NumTimesThrough T2Tes0:                                 ;Has spindle done a full rotation?
        LD      A,NumTimesThrough       ;If number of pulses is greater than
        IFGT    A,#NumReCalc            ;  8, then
        JSR     ReCalcXY                ;  recalculate the XY adjustor
                                        ;  Do another table lookup for X/Y
        JMP     T2Exit T2First:                                ;FIRST EDGE, THROW IT AWAY
        RBIT    T2PNDA,T2CNTRL          ;Clear pending flag for A pin and
        LD      X,#NewEdge              ;Move the newest edge value to
                                        ;PastEdge
        LD      B,#PastEdge             ;  and exit T2Fir2:
        LD      A,[X+]                  ;Get the newest edge and store it
                                        ;in PastEdge
        X       A,[B+]

IFBNE   #02
        JP      T2Fir2

JSR     InitHiLo                ;Initialize the High and LowTimes

RBIT    FirstEdge,TPFLG1        ;Clear first edge flag
        LD      UnderflowCount,#00      ;Zero underflow counter
        SBIT    SecondEdge,TPFLG1       ;Set the second edge flag (for XY
                                        ;adjustor)
        JMP     XITISR                  ;Exit interrupt service routine T2Under:                                ;INTERRUPT CAUSED BY AN UNDERFLOW
        RBIT    T2PNDA,T2CNTRL          ;Clear pending flag for A pin
        JMP     XITISR T2Spind:                                ;INTERRUPT CAUSED BY (SPINDLE)
                                        ;UNDERFLOW
        LD      A,UnderflowCount        ;Increment the number of underflows
        INC     A                       ;  for the upcoming edge
        X       A,UnderflowCount
        LD      A,UnderFlowCount        ;Get current underflows T2Error:
        JSR     EOTError                ;Set ERROR flag
        JMP     XITISR
T2Exit:                                 ;Positive EDGE EXIT
        LD      UnderFlowCount,#00
T2Ex1:
        RBIT    T2PNDA,T2CNTRL          ;Clear pending flag for A pin and
        JMP     XITISR                  ;  exit T2Ex3:                                  ;UNDERFLOW EXIT
        RBIT    T2C0,T2CNTRL            ;Clear underflow pending flag and
        JMP     XITISR                  ;  exit interrupt service routine
```

;----------------------------------------------------------------
; This routine calculates the amount of time between two edges for tape
; eating.
;----------------------------------------------------------------

```
CalcTime:                                   ;SET UP POINTERS FOR SUBTRACTION LD      X,#PastEdge                     ;Point X to the low byte of past
                                            ; edge
    LD      B,#NewEdge                      ;Point B to the low byte of new edge
    SC                                      ;Set the carry for the subtraction CalcLoop:
    LD      A,[X]                           ;Get the Pastedge SUBC    A,[B]                           ;Subtract the new edge from the
                                            ; past edge
    X       A,[X+]                          ;Store the result in X (overwrite
                                            ; the past)
    LD      A,[B+]                          ;increment b index Calc0:
    IFBNE   #0E                             ;If B is not pointing past the end
    JP      CalcLoop                      ; of the new edge (2 bytes), loop back up IFC                                     ;Finished subtracting, if carry is
                                            ; set;
    JP      CalcPos                       ;   result is positive SC                                      ;Result is negative, subtract 1 from
    LD      A,UnderflowCount              ; the new edge's number of underflows
    SUBC    A,#01
    X       A,UnderflowCount CalcPos:
    LD      X,#PastEdge                     ;Move the past edge value to
TempTime
    LD      B,#TempTime                     ;This is the actual time between
                                            ; edges Calc1:
    LD      A,[X+]                          ;Get the new time and store it in
    X       A,[B+]                          ; TempTime IFBNE   #0A
    JP      Calc1

LD      X,#NewEdge                      ;Move the newest edge value to
PastEdge
    LD      B,#PastEdge                     ; and exit Calc2:
    LD      A,[X+]                          ;Get the newest edge and store it
                                            ; in
    X       A,[B+]                          ; PastEdge IFBNE   #02
    JP      Calc2

RET                                     ;Return to calling routine
```

```
;--------------------------------------------------------------
; This routine gets the XY adjustor value from a look-up table.
;
;--------------------------------------------------------------
XYLookUp:
    LD      A,HighUnder             ;Get the underflows for the
                                    ;highest value
    IFEQ    A,#00                   ;If first time thru, use the
                                    ;current underflows
    LD      A,TempUnder XYL1:
    IFGT    A,#013                  ;check underflow range
    JMP     XYError IFEQ    A,#00                   ;are there zero underflows, due to
                                    ;fast speeds?
    JP      XYL10
    JP      XYL2                    ; no, so continue lookup XYL10:
    IFEQ    A,#00                   ;are there zero underflows, due to
                                    ;fast speeds?
    INC     A                       ;and fast so underflows =0, use 1
                                    ;underflow lookup
XYL2:

SC                              ;Set the carry for the subtract
    SUBC    A,#01                   ;  current edge and subtract 1

X       A,TempReg               ;Multiply by 2 (add A to A) to get
    LD      A,TempReg               ;a two-byte offset into XYTable
    ADD     A,TempReg X       A,TempReg               ;Point A to the XY Look-Up Table and
    LD      SREG,#001               ;set ram block to 1
    LD      A,#XYTable              ;  add the offset in TempReg
    ADD     A,TempReg X       A,TempReg               ;Move the pointer to B
    LD      B,#TempReg
    LD      A,[B]
    LD      X,#00FE                 ;X points to B register
    X       A,[X]
    LD      A,[B+]                  ;Get the first byte in TempReg and LD      SREG,#000
    LD      X,#XYValue              ;Point X to the first byte of
    X       A,[X+]                  ;xyvalue move it into XYValue
    LD      SREG,#01
    LD      A,[B]                   ;Get the second byte in TempReg and
    LD      SREG,#000
    X       A,[X]                   ;  move it into XYValue
    RBIT    SecondEdge,TPFLG1       ;Initialize second edge flag
    RC
    RET XYError:
    SC
    RET
```

;----------------------------------------------------------------
; This routine recalculates the XY adjustor value.
;----------------------------------------------------------------

ReCalcXY:

```
    LD      NumTimesThrough,#00         ;Clear loop counter
    JSR     XYLookup JSR     InitHiLo                    ;Re-initialize the High and LowTimes
    JSR     StoreTimes                  ;Put the current time in Hi and
                                        ;Low values
    RET
```

```
;--------------------------------------------------------------------
; This routine stores the newest time.  If the new time is greater
; than the stored high time, then it becomes the new high time.  If
; the new time is less than the stored low time, it becomes the new
; low time.
;--------------------------------------------------------------------

StoreTimes:                            ;IF LOWTIME=0, SET LOWTIME AND
                                       ; HIGHTIME
    LD      B,#LowTime                 ;Point X to the start of LowTime StLp1:
    LD      A,[B+]                     ;Get the first byte of LowTime
    IFNE    A,#000                     ;If not 0, then compare new time to
    JMP     StLp4                      ;  HighTime and LowTime IFBNE   #06                        ;If B is not pointing past the end
    JP      StLp1                      ;  of LowTime, loop back up LD      X,#TempTime                ;Point X to the new time
    LD      B,#LowTime                 ;Replace LowTime with the new time StLp2:                                 ;LOWTIME=0, SET LOWTIME TO NEW TIME
    LD      A,[X+]                     ;Get the new time and store it in
    X       A,[B+]                     ;  LowTime IFBNE   #06                        ;If B is not pointing past the end
    JP      StLp2                      ;  of LowTime, loop back up LD      X,#TempTime                ;LOWTIME=0, SET HIGHTIME TO NEW TIME
    LD      B,#HighTime                ;Replace HighTime with the new time StLp3:
    LD      A,[X+]                     ;Get the new time and store it in
    X       A,[B+]                     ;  HighTime IFBNE   #07                        ;If B is not pointing past the end
    JP      StLp3                      ;  of HITime, loop back up

RET

StLp4:                                 ;LOWTIME<>0, CHECK FOR NEW LOW OR
                                       ; HIGH
    LD      B,#LowTime                 ;Set up pointers for CmpThree
                                       ;routine
    LD      X,#TempTime JSR     CmpThree                   ;Compare all three bytes IFNC                               ;PASTEDGE > LOWTIME, CHECK HIGHTIME
    JP      StLp6

LD      B,#LowTime                 ;TempTime < LOWTIME, REPLACE LOWTIME
    LD      X,#TempTime StLp5:
    LD      A,[X+]                     ;Get the TempTime value and move it
    X       A,[B+]                     ;  to LowTime
```

```
        IFBNE       #06                     ;Get all three bytes
        JP          StLp5

RET                                 ;Exit

StLp6:
        LD          B,#HighTime             ;Set up pointers for CmpThree
                                            ;routine
        LD          X,#TempTime JSR         CmpThree                ;Compare all three bytes IFC                                 ;TempTime < HIGHTIME, EXIT
        RET LD          B,#HighTime             ;TempTime > HIGHTIME, REPLACE
                                            ;HIGHTIME
        LD          X,#TempTime StLp7:
        LD          A,[X+]                  ;Get the TempTime value and move it
        X           A,[B+]                  ;  to HighTime IFBNE       #07                     ;Get all three bytes
        JP          StLp7
        RET
```

```
;----------------------------------------------------------------
; This routine determines whether the new pulse width time is valid.
;
; On Entry:  A and B point to Value 1
;            X points to Value 2
;
; On Exit:   A,B,X are destroyed
;            Carry set, new time is not valid - error
;            Carry clear, new time is valid - continue
;----------------------------------------------------------------

CheckNewTime:                           ;IF TIME > HIGHTIME + XYVALUE, ERROR

LD      X,#HighTime             ;Move HighTime to temporary storage
        LD      B,#TempComp CkLp1:
        LD      A,[X+]
        X       A,[B+]                  ;Copy three bytes then continue IFBNE   #09
        JP      CkLp1

LD      X,#TempComp             ;ADD XYVALUE TO HIGHTIME (TEMPCOMP)
        LD      B,#XYValue
        RC                              ;Reset carry for addition CkLp2:
        LD      A,[X]
        X       A,TEMPREG
        LD      A,[B+]
        ADC     A,TEMPREG
        X       A,[X+]                  ;Store result in TempComp IFBNE   #00                     ;Add first two bytes
        JMP     CkLp2

IFNC                            ;No overflow to third byte, continue
        JP      CkLp3

LD      A,[X]                   ;Overflow occurred, increment last
                                        ;byte
        INC     A
        X       A,[X]

CkLp3:                                  ;COMPARE NEW TIME TO HIGHTIME+
                                        ;XYVALUE
        LD      B,#TempTime
        LD      X,#TempComp JSR     CmpThree IFC                             ;TempTime > TempComp, Error
        RET                             ;Return with carry set for error ;IF TIME < LOWTIME - XYVALUE, ERROR
        LD      X,#LowTime              ;Move LowTime to temporary storage
        LD      B,#TempComp
```

```
CkLp4:
   LD      A,[X+]                  ;Copy three bytes then continue
   X       A,[B+]

IFBNE   #09
   JP      CkLp4

LD      X,#TempComp             ;SUBTRACT XYVALUE FROM LOWTIME
                                   ;(TEMPCOMP)
   LD      B,#XYValue
   SC                              ;Set carry for subtraction CkLp5:
   LD      A,[X]
   SUBC    A,[B]
   X       A,[X+]                  ;Store result in TempComp
   LD      A,[B+]                  ;This is used only to increment B IFBNE   #00                     ;Subtract first two bytes
   JP      CkLp5

IFC                             ;No underflow from third byte,
                                   ;continue
   JP      CkLp6

LD      A,[X]                   ;Overflow occurred, decrement last
                                   ;byte
   DEC     A
   X       A,[X].

CkLp6:                             ;COMPARE NEW TIME TO LOWTIME-XYVALUE
   LD      B,#TempTime
   LD      X,#TempComp JSR     CmpThree IFC                             ;If carry, TempTime > TempComp, no
                                   ;error
   JP      CkLp7                   ;  Reset carry and exit SC                              ;  Set carry for error and exit
   RET CkLp7:
   RC
   RET
```

```
    .FORM
;----------------------------------------------------------------------
; This routine compares two three-byte values and returns with the
; carry set if Value 2 > Value 1, carry cleared if Value 1 > Value 2.
;
; On Entry: A and X point to Value 1
;                      B points to Value 2
;
; On Exit:  A,B,X are destroyed
;           Carry set, result is positive
;           Carry clear, result is negative
;----------------------------------------------------------------------

CmpThree:
    LD      TmpCount,#00                ;Init counter
    SC                                  ;Set the carry for the subtraction Cmp3Loop:
    LD      A,[B+]                      ;Get Value 2
    PUSH    A                           ;Keep it
    LD      A,[X]
    X       A,TEMPREG      ;Keep x
    POP     A                           ;Get back value 2

SUBC    A,TEMPREG
    LD      A,[X+]                      ;This is used only to increment X LD      A,TmpCount
    INC     A
    X       A,TmpCount
    LD      A,TmpCount IFNE    A,#03                       ;If not pointing past the end
    JP      Cmp3Loop                    ;  of Value 1, loop back up RET                                 ;Return to calling routine
```

```
.Form
;--------------------------------------------------------------------
; This routine initializes the HighTime and LowTime variables.
; Use for comparing timer values for timer 2 and 3 for End of tape
; and Tape eating routines.
;--------------------------------------------------------------------

InitHiLo:
    LD      X,#HighTime             ;Point X to the HighTime
    LD      B,#LowTime              ;Point B to the LowTime LD      A,#000                  ;Initialize low bytes
    X       A,[X+]
    LD      A,#000
    X       A,[B+]

LD      A,#000                  ;Initialize high bytes
    X       A,[X+]
    LD      A,#000
    X       A,[B+]

LD      A,#000                  ;Initialize underflows
    X       A,[X]
    LD      A,#000
    X       A,[B]

RET
```

We claim:

1. A tape player apparatus for playing a cassette tape cartridge having a magnetic tape which is wound between a take-up reel and a supply reel, the apparatus comprising:

a drive motor;

a take-up reel spindle driven by the drive motor, the take-up reel spindle having a rotational frequency;

a supply reel spindle;

means for sensing the rotational frequency of the take-up reel spindle, the sensing means producing an output signal having a pulse width inversely proportional to the rotational frequency;

means for measuring the pulse width of the output signal;

means for comparing the pulse width of the output signal with a variable predetermined range of pulse widths, the range being variable as a function of the rotational frequency of the take-up reel, said comparing means further comprising a microprocessor based control using a comparison function defined by:

$t_{low} - Y \leq t_{current} \leq t_{high} + X$ for a normal operating condition; and $(t_{current} < t_{low} - Y)$ or $(t_{current} > t_{high} + X)$ for an aberrant operating condition where $t_{low}$ and $t_{high}$ are first and second pulse width values determined by rotating the take-up reel spindle a predetermined rotation wherein the sensing means produces the output signal having a plurality of pulses, each pulse having a pulse width which is inversely proportional to the rotational frequency and then ranking the pulse width values of the plurality of pulses where:

$t_{low}$ is the lowest pulse width value, $t_{high}$ is the highest pulse width value, $t_{current}$ is the pulse width being measured, X is a first constant related to the values of $t_{low}$ and $t_{high}$, and Y is a second constant related to the values of $t_{low}$ and $t_{high}$, wherein each of the above variables are updated in a loop function until a control status signal is initiated;

means for interrupting operation of the take-up reel spindle in response to the pulse width falling outside of the predetermined range thereby denoting an aberrant tape condition.

2. The apparatus of claim 1 wherein the measuring means comprises a microprocessor based control.

3. The apparatus of claim 1 wherein the predetermined distance is one rotation.

4. The apparatus of claim 1 wherein the sensing means comprises:

an actuator associated with the take-up reel spindle which rotates with the take-up reel spindle; and a sensor mounted on the apparatus, the sensor actuated by the actuator to produce an output signal.

5. The apparatus of claim 4 wherein the sensor comprises a reed switch.

6. The apparatus of claim 4 wherein the sensor comprises a Hall Effect sensing device.

7. The apparatus of claim 4 wherein the actuator is a disc having alternating magnetized segments.

8. A tape player apparatus for playing a cassette tape cartridge having a magnetic tape which is wound between a take-up reel and a supply reel, the apparatus comprising:

a drive motor;

a take-up reel spindle driven by the drive motor, the take-up reel spindle having a rotational frequency;

a supply reel spindle;

means for sensing the rotational frequency of the take-up reel spindle, the sensing means producing an output signal having a pulse width inversely proportional to the rotational frequency;

means for measuring the pulse width of the output signal;

means for comparing the pulse width of the output signal with a variable predetermined range of pulse widths, the range being variable as a function of the rotational frequency of the take-up reel;

means for interrupting operation of the take-up reel spindle in response to the pulse width falling outside of the predetermined range thereby denoting an aberrant tape condition, wherein the range of pulse widths is defined by:

$t_{low} - Y \leq t_{current} \leq t_{high} + X$ for a normal operating condition, and $(t_{current} < t_{low} - Y)$ or $(t_{current} > t_{high} + X)$ for an aberrant operating condition where:

$t_{low}$ is the lowest pulse width value occurring during a predetermined time period, $t_{high}$ is the highest pulse width value occurring during the predetermined time period, $t_{current}$ is the pulse width being measured, X is a first constant related to the values of $t_{low}$ and $t_{high}$, and Y is a second constant related to the values of $t_{low}$ and $t_{high}$, wherein each of the above variables are updated in a loop function until a control status signal is initiated.

9. The apparatus of claim 8 wherein the predetermined time period is the time for the take-up reel to rotate one rotation.

* * * * *